(12) United States Patent
Yoshida

(10) Patent No.: US 6,256,113 B1
(45) Date of Patent: Jul. 3, 2001

(54) FACSIMILE APPARATUS HAVING A MAIL POST TRANSMISSION INCLUDING PAGE INFORMATION INDICATING A PLURALITY OF GROUPS OF TRANSMISSION INFORMATION

(75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/728,033

(22) Filed: Oct. 9, 1996

Related U.S. Application Data (63) Continuation of application No. 08/355,495, filed on Dec. 14, 1994, now abandoned.

(30) Foreign Application Priority Data

Dec. 16, 1993  (JP) .................................................. 5-343643

(51) Int. Cl.⁷ .................................................. H04N 1/00
(52) U.S. Cl. .......................................... 358/402; 358/434
(58) Field of Search ........................ 358/402, 434–436, 358/440, 1.9; 379/100

(56) References Cited

U.S. PATENT DOCUMENTS

| 4,811,111 | * | 3/1989 | Kurokawa | 358/440 |
| 4,849,816 | * | 7/1989 | Yoshida | 358/434 |
| 4,870,503 | * | 9/1989 | Miura | 358/440 |
| 5,414,528 | * | 5/1995 | Hatamura | 358/402 |

* cited by examiner

Primary Examiner—Thomas D. Lee
Assistant Examiner—Stephen Brinich
(74) Attorney, Agent, or Firm—Fitzpatrick, Cella, Harper & Scinto (57) ABSTRACT

An object of the invention is to provide a A facsimile apparatus can properly classify image information of a plurality of communications on the reception side in a mail post communication. In the case where the mail post communication is selected by a transmitter, when the receiver has a function to classify by a sorter every communication, information indicative of the presence of a plurality of communications and information of transmitter and receiver are added as information of the first page and the resultant information is transmitted. Therefore, the operator on the receiver side can properly distribute the information of the mail post communication to the designated partner side.

13 Claims, 10 Drawing Sheets

FACSIMILE APPARATUS HAVING A MAIL POST TRANSMISSION INCLUDING PAGE INFORMATION INDICATING A PLURALITY OF GROUPS OF TRANSMISSION INFORMATION

This application is a continuation, of application Ser. No. 08/355,495 filed Dec. 14, 1994, now abandoned.

BACKGROUND OF THE INVENTION

1. Field of the Invention

The invention relates to a facsimile apparatus having a mail post function.

2. Related Background Art

Hitherto, there is known a facsimile apparatus having a mail post function. The mail post function is a function such that a time to transmit information to a specific destination is designated and, when the designated time comes, original images accumulated until such a time are automatically transmitted in an undivided transmission operation, hereinafter called a "lump". In such a function, however, a receiver does not recognize whether a mail post communication has been executed or not, and even in the case where the mail post communication has been executed on the transmitter side, it is processed as a reception of one ordinary communication.

On the other hand, there is considered a construction such that when the mail post communication is selected, a pause of each communication is notified, thereby classifying the communications for individual communication on the receiver side. However, in the case where the receiver does not have the function of the present invention and the receiver side has the function to classify every communication, the mail post communication is still processed as one process.

In the receiver, therefore, the image information having inherently a plurality of communications by the mail post communication is processed as one communication and is classified by a sorter, so that there is a drawback such that all of the information is distributed to the first destination of the plurality of communications for the operator.

SUMMARY OF THE INVENTION

It is an object of the present invention to provide a facsimile apparatus which can solve the above problems.

It is another object of the invention to provide a facsimile apparatus which can properly classify image information of a plurality of communications on the reception side in a mail post communication.

The above and other objects and features of the present invention will become apparent from the following detailed description and the appended claims with reference to the accompanying drawings.

BRIEF DESCRIPTION OF THE DRAWINGS

FIG. 1 is comprised of FIG. 1A and FIG. 1B showing block diagrams illustrating a construction of an embodiment of the present invention;

DETAILED DESCRIPTION OF THE PREFERRED EMBODIMENTS

Figures 1, 1A:
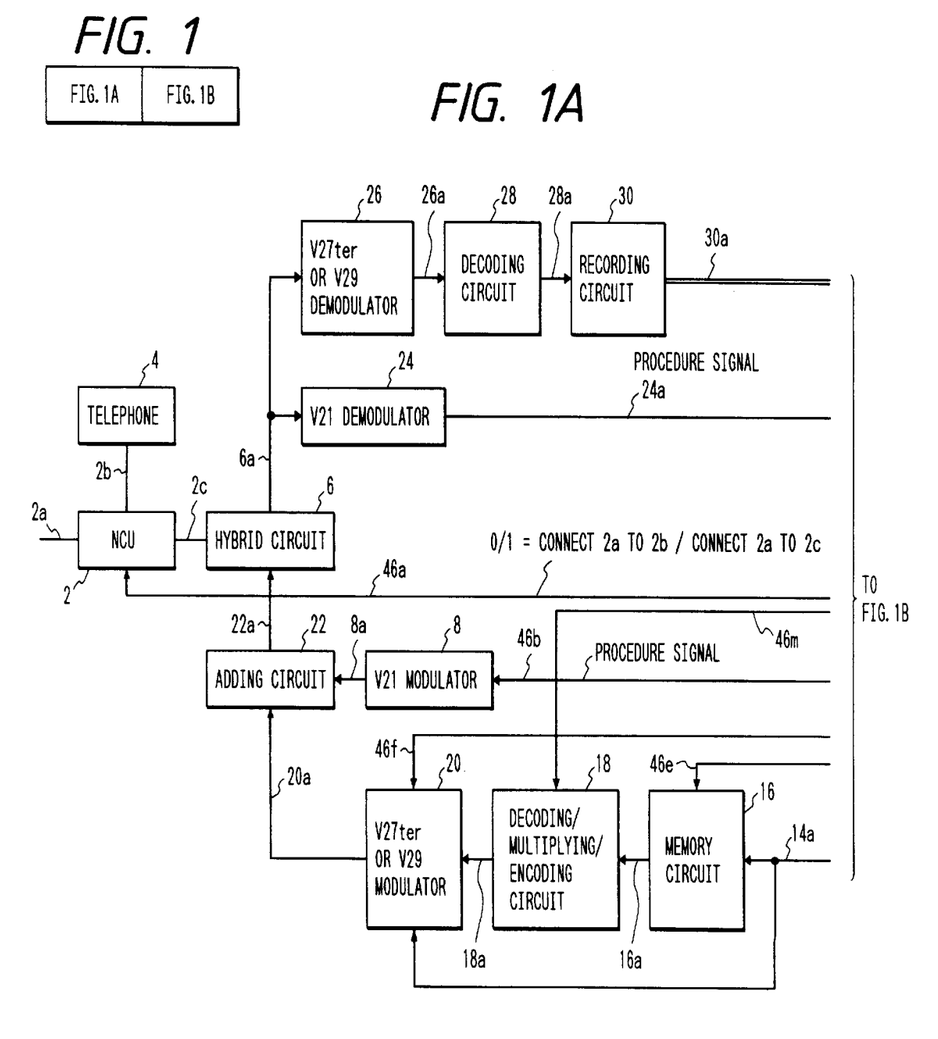
Figure 1B:
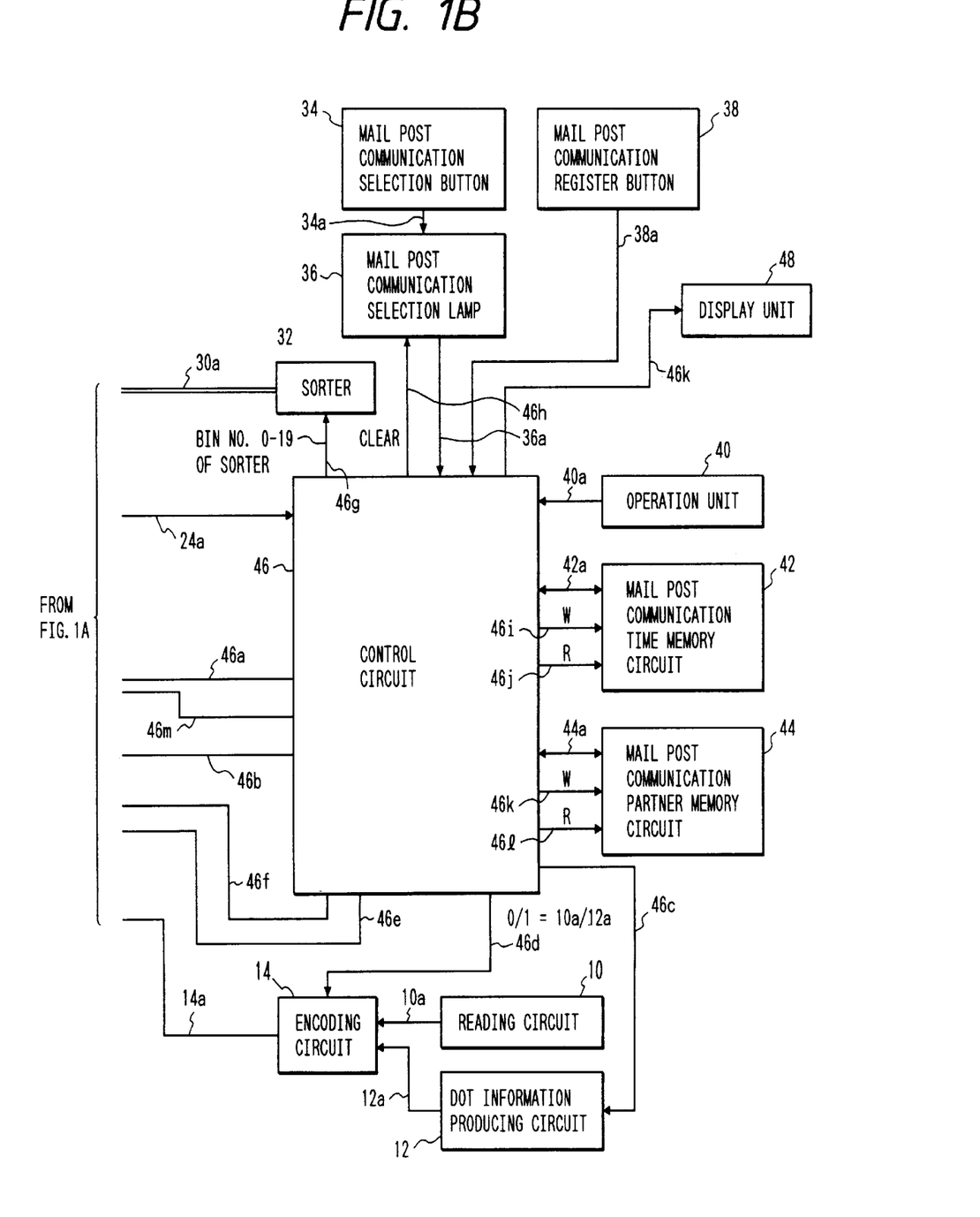

FIGS. 1A and 1B are block diagrams showing the first embodiment of a facsimile apparatus which can perform a mail post transmission according to the invention.

The mail post transmission denotes a function such that a time to transmit information to a specific destination is designated and, when the designated time comes, original images accumulated until such a time are automatically transmitted in a lump.

In order to use a telephone network for data communication or the like, an NCU (network control unit) 2 is connected to a terminal of a telephone line and controls the connection of a telephone exchange network, switches the line to a data communication path, and holds a loop. When a signal level (signal line 46a) from a control circuit 46 is equal to "0", the NCU 2 connects a telephone line 2a to a telephone 4 side. When the signal level is equal to "1", the NCU 2 connects the telephone line 2a to a facsimile apparatus side. In the ordinary state, the telephone line 2a is connected to the telephone 4 side.

A hybrid circuit 6 separates a signal to be transmitted and a received signal, transmits a transmission signal from an adding circuit 22 to the telephone line 2a via the NCU 2, receives a signal from the partner side via the NCU 2, and sends the signal to a V29 demodulator 26 and a V21 demodulator 24 via a signal line 6a.

A V21 modulator 8 is a modulator to execute a modulation based on the well-known CCITT recommendation V21. The V21 modulator 8 modulates a procedure signal (signal line 46b) from the control circuit 46 and transmits to the adding circuit 22 through a signal line 8a.

A reading circuit 10 sequentially reads an image signal of one line in the main scan direction from a transmission original, forms a signal train indicative of a black and white binary value, and sends the binary data to an encoding circuit 14 from a signal line 10a. The reading circuit 10 comprises an image pickup device such as a CCD (charge coupled device) and an optical system.

A dot information producing circuit 12 forms dot information of characters indicative of the following contents. Namely, in the case where original images of a plurality of communications are transmitted in a lump when performing the mail post transmission, characters indicating that there are a plurality of communications in the mail post communication, characters indicative of the transmission side and the reception side corresponding to each communication, and characters indicative of the number of originals [for example, (10 originals: Mr. Yoshida at the FAX development division→Mr. Ishida at the FAX article planning division), (12 originals: Mr. Yamada at the FAX factory→Mr. Murakami at the FAX article planning division), (6 originals: Mr. Tanaka at the FAX quality evaluation division→Mr. Taguchi at the FAX article planning division)] are formed as dot information. The dot information forming circuit 12 receives character information outputted to a signal line 46c, converts it into dot information and supplies the dot information from a signal line 12a to the encoding circuit 14.

When a signal at the signal level "0" is outputted to a signal line 46d, the encoding circuit 14 receives the read data outputted to the signal line 10a. When a signal at the signal level "1" is outputted to the signal line 46d, the encoding circuit 14 receives the dot information (dot pattern data) outputted to the signal line 12a. The encoding circuit executes an encoding (MH encoding or MR encoding) to the input data and outputs the encoded data from a signal line 14a.

A memory circuit 16 stores the encoded data outputted to the signal line 14a in accordance with a control of a signal line 46e and outputs the stored data to a signal line 16a.

A decoding/multiplying/encoding circuit 18 receives the information of the signal line 16a and decodes and variably multiplies it as necessary in accordance with a control of a signal line 46m. After that, the circuit 18 again outputs the encoded data to a signal line 18a.

When a signal at the signal level "0" is outputted to a signal line 46f, a V27ter or V29 modulator 20 receives the encoded data outputted to the signal line 14a. When a signal at the signal level "1" is outputted to the signal line 46f, the modulator 20 receives the encoded data outputted to the signal line 18a. The modulator 20 executes the modulation based on the well-known CCITT recommendation V27ter (differential phase modulation) or V29 (orthogonal modulation) to the input data and outputs the modulated data to the adding circuit 22 through a signal line 20a.

The adding circuit 22 adds an output of the V21 modulator 8 and an output of the V27ter or V29 modulator 20. An output of the adding circuit 22 is sent to the hybrid circuit 6.

The V21 demodulator 24 executes the demodulation based on the well-known CCITT recommendation V21. The demodulator 24 receives a procedure signal from the hybrid circuit 6 by the signal line 6a, executes the V21 demodulation, and sends the demodulated data to the control circuit 46 through a signal line 24a.

The V27ter or V29 demodulator 26 executes the demodulation based on the well-known CCITT recommendation V27ter or V29. The demodulator 26 receives the modulation image signal from the hybrid circuit 6, demodulates it, and sends the demodulated data to a decoding circuit 28 from a signal line 26a.

The decoding circuit 28 executes a decoding (MH decoding or MR decoding) to the data from the signal line 26a and outputs the decoded data to a recording circuit 30 through a signal line 28a.

The recording circuit 30 receives the data outputted to the signal line 28a and sequentially records the lines one by one. The recording circuit 30 records information onto a recording paper which has previously been cut and feeds out the recording paper to a conveying path 30a. After that, the recording papers are classified by a sorter 32. The recording circuit 30 can also record on a page unit basis.

The sorter 32 stores the recording papers recorded by the recording circuit 30 to bins corresponding to the bin number outputted to a signal line 46g. A total of 20 bins in the sorter 32 from the 0th bin to the 19th bin are presumed.

A mail post communication selection button 34 is a button which is depressed by the operator when the mail post communication is selected. When the button 34 is depressed, a depression pulse is generated to a signal line 34a.

When the mail post communication is selected, a mail post communication lamp 36 is lit, thereby indicating such a state. When a clear pulse is generated to a signal line 46h, the mail post communication lamp 36 is turned off. Each time the pulse is generated on the signal line 34a, the lamp 36 repeats the light-on/off operations. When the lamp 36 is off, it generates a signal at the signal level "0" to a signal line 36a. When the lamp 36 is lit, it generates a signal at the signal level "1" to the signal line 36a.

A mail post communication register button 38 is used when a partner side to be call-originated and a time for originating call are registered in correspondence to the mail post communication number. When the button 38 is depressed, a depression pulse is generated to a signal line 38a.

An operation unit 40 has a ten-key, a * key, a # key, a start key, a one-touch dial key, a contraction dial key, other function keys, and the like. When those keys are depressed, the information corresponding to the keys depressed is outputted to a signal line 40a.

A mail post communication time memory circuit 42 stores the mail post communication time in correspondence to the mail post communication number. As mail post communication numbers, 1 to 5 are presumed here.

When the mail post communication time corresponding to the mail post communication number is stored into the memory circuit 42, the mail post communication No. n (n: one of 1 to 5) and the space of one character are outputted to a signal line 42a. After that, the mail post communication time [hh:mm] (for example, 11:20) corresponding to the mail post communication No. n is outputted. Further, a write pulse is generated to a signal line 46i.

When the mail post communication time corresponding to the mail post communication No. n stored in the memory circuit 42 is read out, the mail post communication No. n (n: one of 1 to 5) is outputted to the signal line 42a. After that, a read pulse is generated to a signal line 46j. Thus, the mail post communication time stored in correspondence to the mail post communication No. n is outputted from the memory circuit 42 to the signal line 42a.

A mail post communication partner memory circuit 44 stores the telephone number of the mail post communication partner side in correspondence to the mail post communication number.

When the mail post communication partner corresponding to the mail post communication number is stored into the memory circuit 44, the mail post communication No. n (n: one of 1 to 5) and the space of one character are outputted to a signal line 44a. Subsequently, the telephone number (for example, 03-3466-1111) of the mail post communication partner corresponding to the mail post communication No. n is outputted. After that, the write pulse is generated to a signal line 46k. Further, the name of the partner side can be stored.

When reading out the mail post communication partner which has been stored in the memory circuit 44 and corresponds to the mail post communication No. n, the mail post communication No. n (n: one of 1 to 5) is outputted to the signal line 44a. After that, the read pulse is generated to a signal line 46l. The memory circuit 44 outputs the mail post communication partner stored in correspondence to the mail post communication No. n to the signal line 44a.

In the embodiment, the control circuit 46 mainly executes the following control. First, at the time of the mail post communication, information indicating whether the receiver has pause classifying means for classifying the image information by the pause of each communication which is notified from the transmitter and/or sorter classifying means for classifying every communication by the sorter or not is notified from the receiver to the transmitter. When the mail post communication is selected, in the case where the receiver has the pause classifying means, the transmitter designates the mode to classify the information by the pause of each communication into the receiver and notifies only the pause of each communication to the receiver. When the receiver does not have the pause classifying means but has the sorter classifying means, the transmitter designates the mode to classify every communication by the sorter into the receiver and adds page information including information indicative of the presence of a plurality of communications and the information of the transmission side and reception side to the first page and transmits the resultant information to the receiver. The transmitter does not notify the pause of each communication. Further, when the receiver does not have either of the above two means, the transmitter does not add the additional information to the first page and also does not notify the pause of each communication. In each of the above three cases, it is assumed that each communication is performed from the first page (No. 1).

FIGS. 2 to 6 are flowcharts showing the operation of the control circuit 46 in the embodiment.

Figure 2:
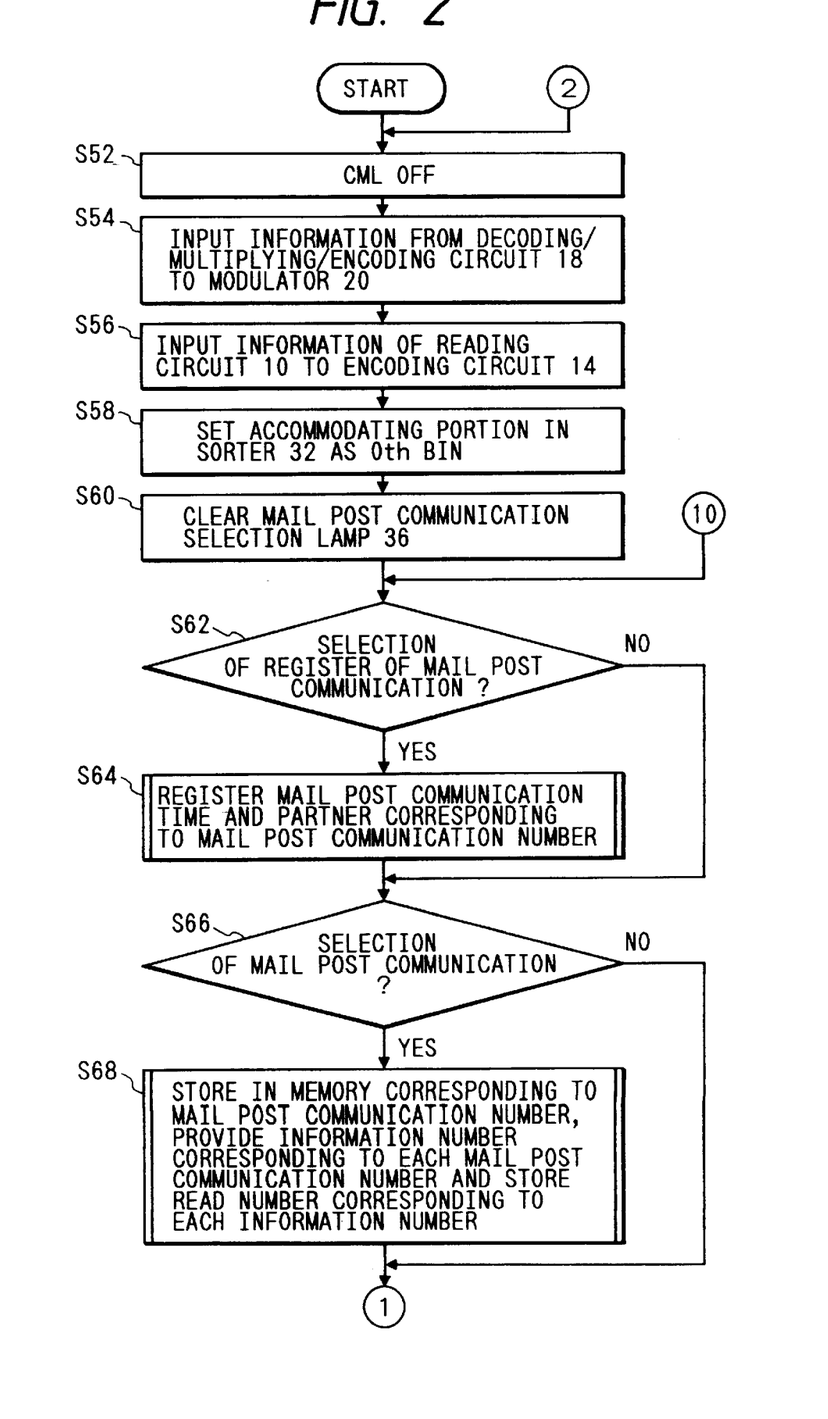
FIG. 2 is a flowchart showing the operation of the first embodiment of the invention.

First in step S52, the signal at the signal level "0" is outputted to the signal line 46a to lines 2a to 2b, namely, a CML (connect modem to line) in NCU2 is turned off. In step S54, the signal at the signal level "1" is outputted to the signal line 46f, thereby setting transmitter so that the modulator 20 receives the information from the decoding/multiplying/encoding circuit 18.

In step S56, the signal at the signal level "0" is outputted to the signal line 46d, thereby setting transmitter so that the encoding circuit 14 receives the information from the reading circuit 10. In step S58, the signal "0" is outputted to the signal line 46g, thereby setting the accommodating portion in the sorter 32 to the 0th bin.

In step S60, a clear pulse is generated to the signal line 46h, thereby clearing the mail post communication selection lamp 36.

In step S62, a check is made to see if the registration of the mail post communication has been selected or not. When the registration is selected, the mail post communication is registered as follows (S64). First, when the operator depresses the mail post communication register button 38, the control circuit 46 allows a display unit 48 to display "Input the mail post communication number" through the signal line 46k. The operator, therefore, inputs, for example, a number from 1 to 5 by using the ten-key as the mail post communication number. "Input the time" is subsequently displayed in the display unit 48. The operator sequentially inputs the time [hh:mm] by the ten-key. The control circuit 46 stores the above data into the memory circuit 42 in correspondence to the mail post communication number. Subsequently, "Input the partner side" is displayed in the display unit 48. The operator inputs the partner side by a dial input by the ten-key or one-touch dial or by inputting numerical values of two digits by the contraction dial and ten-key. The control circuit 46 stores the data of the partner side into the memory circuit 44 in correspondence to the mail post communication number. By the above registration, when the time [hh:mm] comes, if image data corresponding to the mail post communication number has already been stored in the memory circuit 16, all of the images corresponding to the mail post communication number can be mail-post transmitted in a lump to the partner side having the telephone number corresponding to the mail post communication number.

When the registration of the mail post communication is not selected in step S62, step S66 follows and a check is made to see if the mail post communication has been selected or not. The mail post communication is executed as follows. First, the mail post communication lamp 36 is lit by depressing the mail post communication selection button 34. Thus, "Input the mail post communication number" is displayed in the display unit 48. The operator inputs the mail post communication number by inputting, for example, a numerical value from 1 to 5 by the ten-key. In this instance, the name, telephone number, and time of the partner side which executes the mail post communication are displayed in the display unit 48. After confirming the display contents, the operator depresses a start key of the operation unit 40. Thus, the storage of the original image from the reading circuit 10 into the memory circuit 16 is started.

In step S66, when the mail post communication is selected, the storage of the original image into the memory circuit 16 is started in correspondence to the mail post communication number. The information number is provided in correspondence to each mail post communication number and the number of originals to be read is stored in correspondence to each information number (S68).

When the mail post communication is not selected in step S66, step S70 follows. When either one of the mail post communication numbers reaches the communication time, a check is made to see if the image data of the mail post communication has been stored in the mail post communication number or not. If NO, step S72 follows and other processing is executed and step S62 follows.

Figure 3:
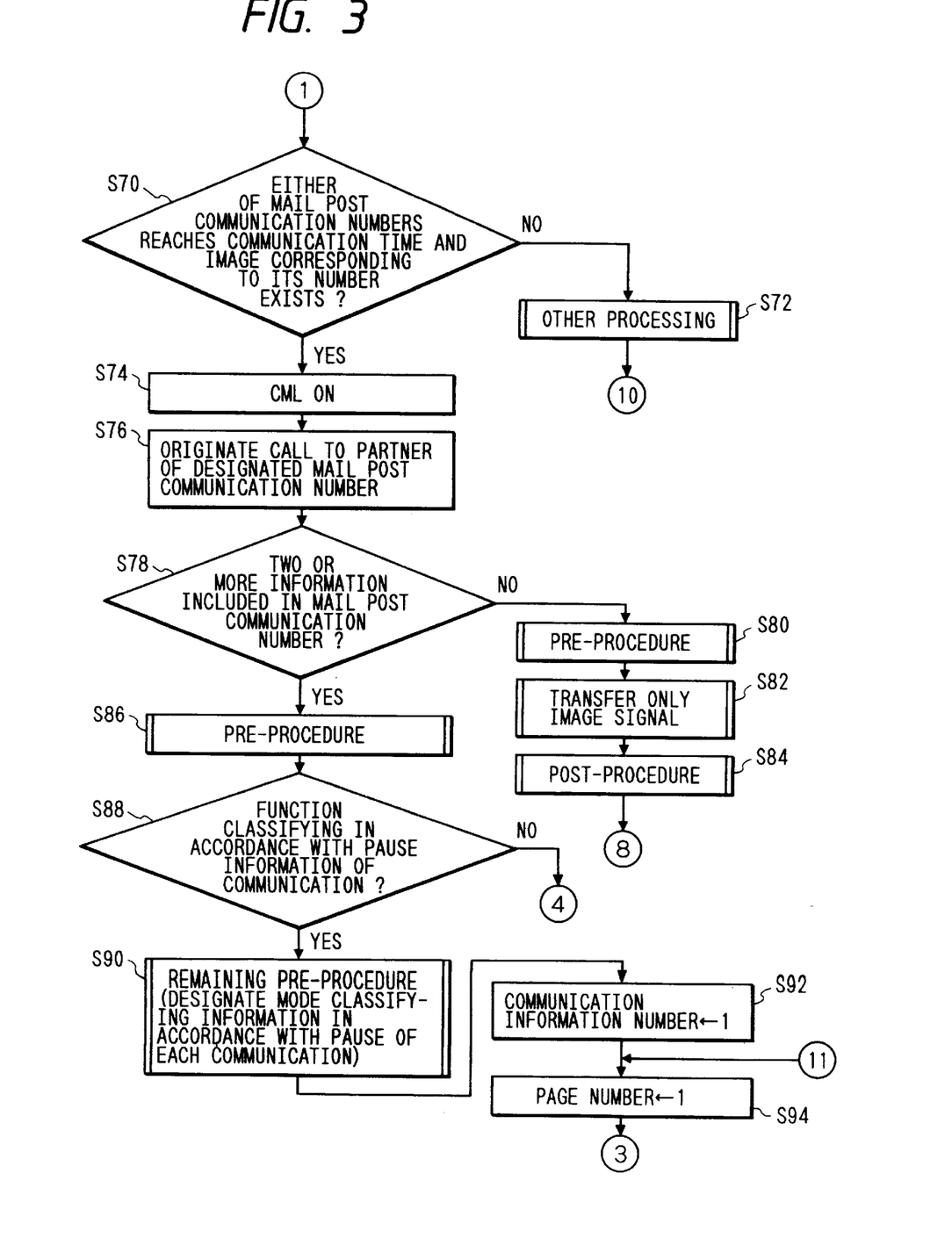
FIG. 3 is a flowchart showing the operation of the first embodiment.

When the image data has been stored, step S74 follows and the signal at the signal level "1" is outputted to the signal line 46a, thereby turning on the CML. In step S76, a call is originated to the partner side corresponding to the designated mail post communication number.

In step S78, a check is made to see if there are two or more groups of original images included in the mail post communication or not. If there are two or more groups, step S86 follows. If the number of groups is less than 2, the processing routine advances to step S80 and subsequent steps and the same operation as that in the ordinary communication is executed.

A pre-procedure is executed in step S80. The image signal of the transmission original is transmitted in step S82. A post-procedure is executed in step S84.

A pre-procedure is performed in step S86. In step S88, a check is made to see if the partner's receiver has the function (pause classifying means) for classifying the information by the pause of each communication that is notified from the transmitter in the mail post communication or not. When the receiver has such a function, step S90 follows. When the receiver does not have such a function, step S120 follows.

Figure 4:
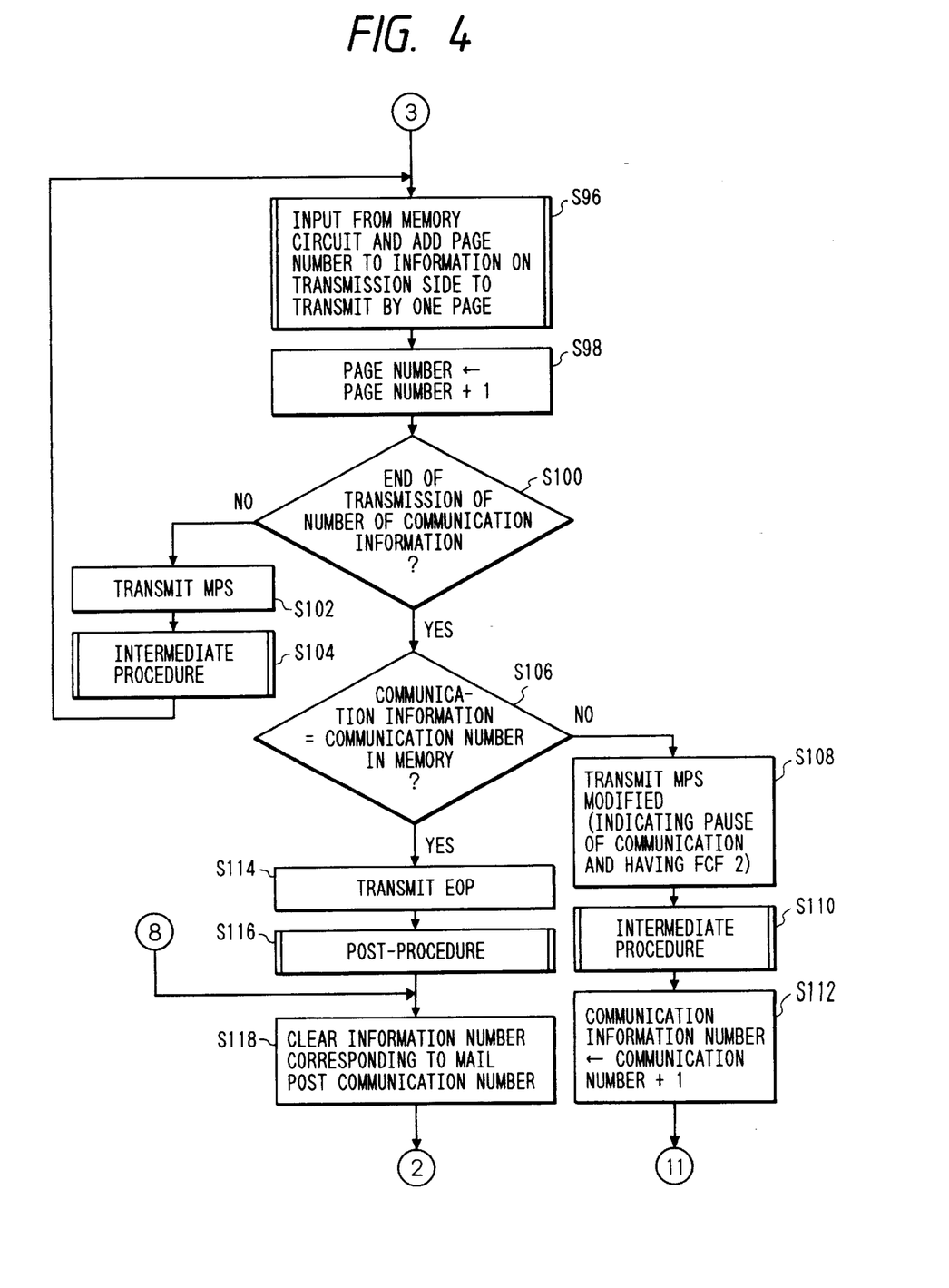
FIG. 4 is a flowchart showing the operation of the first embodiment.

The remaining pre-procedure is executed in step S90 and the mode to classify the information by the pause of each communication is designated into the receiver. In step S92, the communication information of a plurality of groups stored in the memory is mail-post communicated once for each mail post communication number. However, "1" is set into a communication information counter for counting the number of transmission information.

In step S94, the page number is started from "1" every information. "1" is set into the page number. In step S96, the image information stored in the memory circuit 16 is outputted to the signal line 16a through the signal line 46e and is decoded, multiplied, or re-encoded through the signal line 46m as necessary. The page number is added to the information on the transmission side in accordance with a format of the partner's receiver and the data of one page is transmitted. In step S98, when the transmission of the data of one page is finished, the value of the page number is increased by "1".

In step S100, a check is made to see if the transmission of all of the image information corresponding to the number of the communication information has been finished, namely, whether the number of reading originals corresponding to the information number coincides with the page number of the corresponding communication information or not. If the transmission of the information of the number of the communication information is not finished, an MPS signal is transmitted (S102). An intermediate-procedure (S104) is executed and the transmission of the next page is started. When the transmission of the image information corresponding to the communication information number is finished, the processing routine advances to step S106.

In step S106, a check is made to see if the transmission of all of the information stored in correspondence to the mail post communication number has been finished, namely, whether the communication information number is equal to the number of groups of the image information stored in the memory or not. When they are equal in step S106, an EOP signal is transmitted (S124). A post-procedure is executed (S126). The information number corresponding to the mail post communication number is cleared.

When they are not equal in step S106, step S108 follows and an MPS modified (FCF2 is provided) signal indicative of the pause of each communication is transmitted, thereby notifying the pause of each communication to the partner's apparatus (S108). An intermediate-procedure (S110) is performed.

In step S112, therefore, the communication information counter is increased by "1". The processing routine is returned to step S94.

Figure 5:
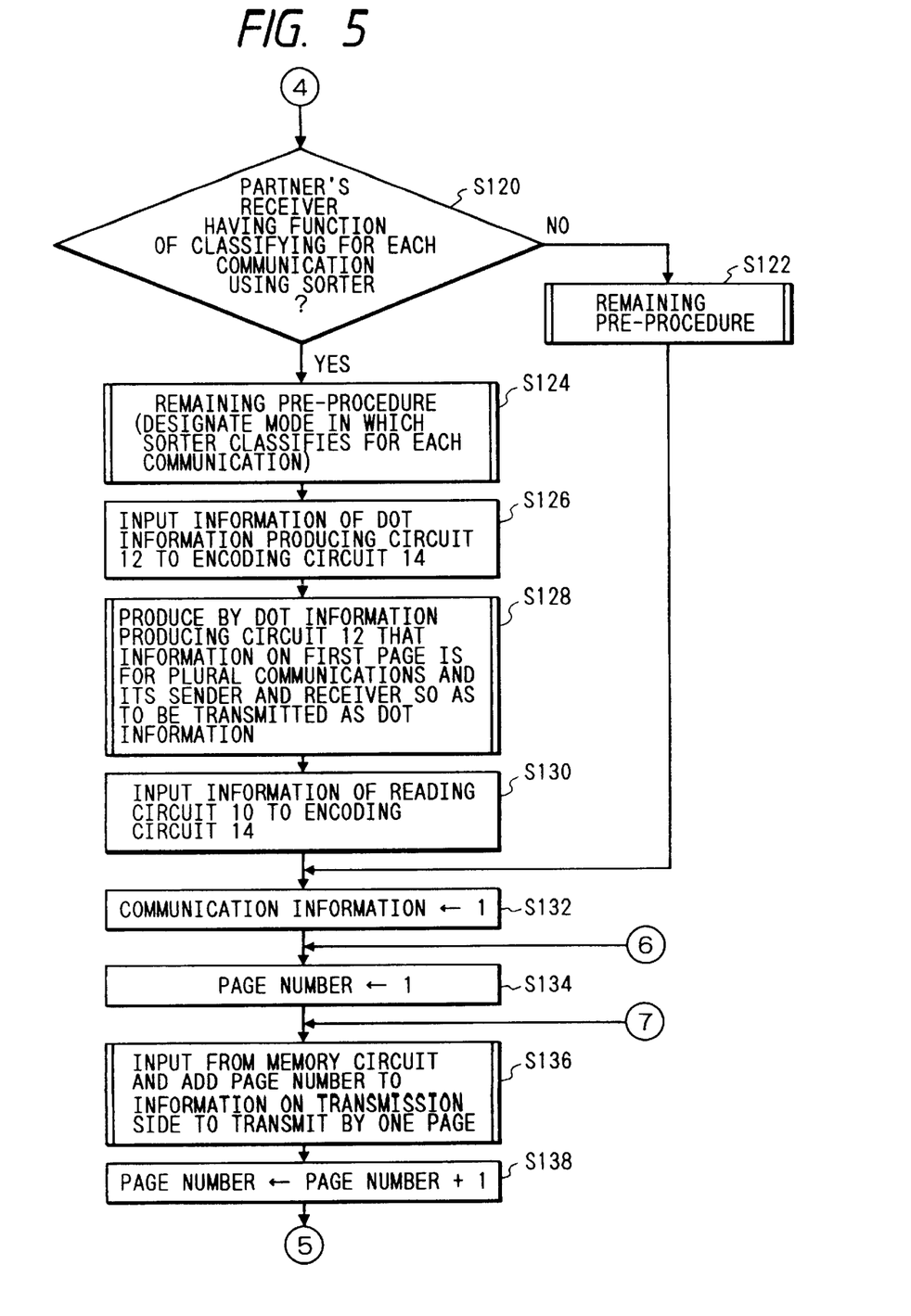
FIG. 5 is a flowchart showing the operation of the first embodiment.

In step S120, a check is made to see if the partner's receiver has the function (sorter classifying means) for classifying every communication by the sorter at the time of reception or not. When the receiver has such a function, step S124 follows. When the receiver does not have the function, step S122 follows and the remaining pre-procedure is performed.

Step S124 expresses the remaining pre-procedure, in which the mode to classify every communication by the sorter is designated. In step S126, the signal at the signal level "1" is outputted to the signal line 46d, thereby setting the encoding circuit 14 so as to input the information of the dot information producing circuit 12.

In step S128, as information of the first page, the information indicative of the presence of a plurality of communications and the information of the transmission side and reception side are formed by the dot information producing circuit 12 and are transmitted as dot information. In step S130, the signal at the signal level "0" is outputted to the signal line 46d, thereby setting the encoding circuit 14 so as to input the information of the reading circuit 10.

Figure 6:
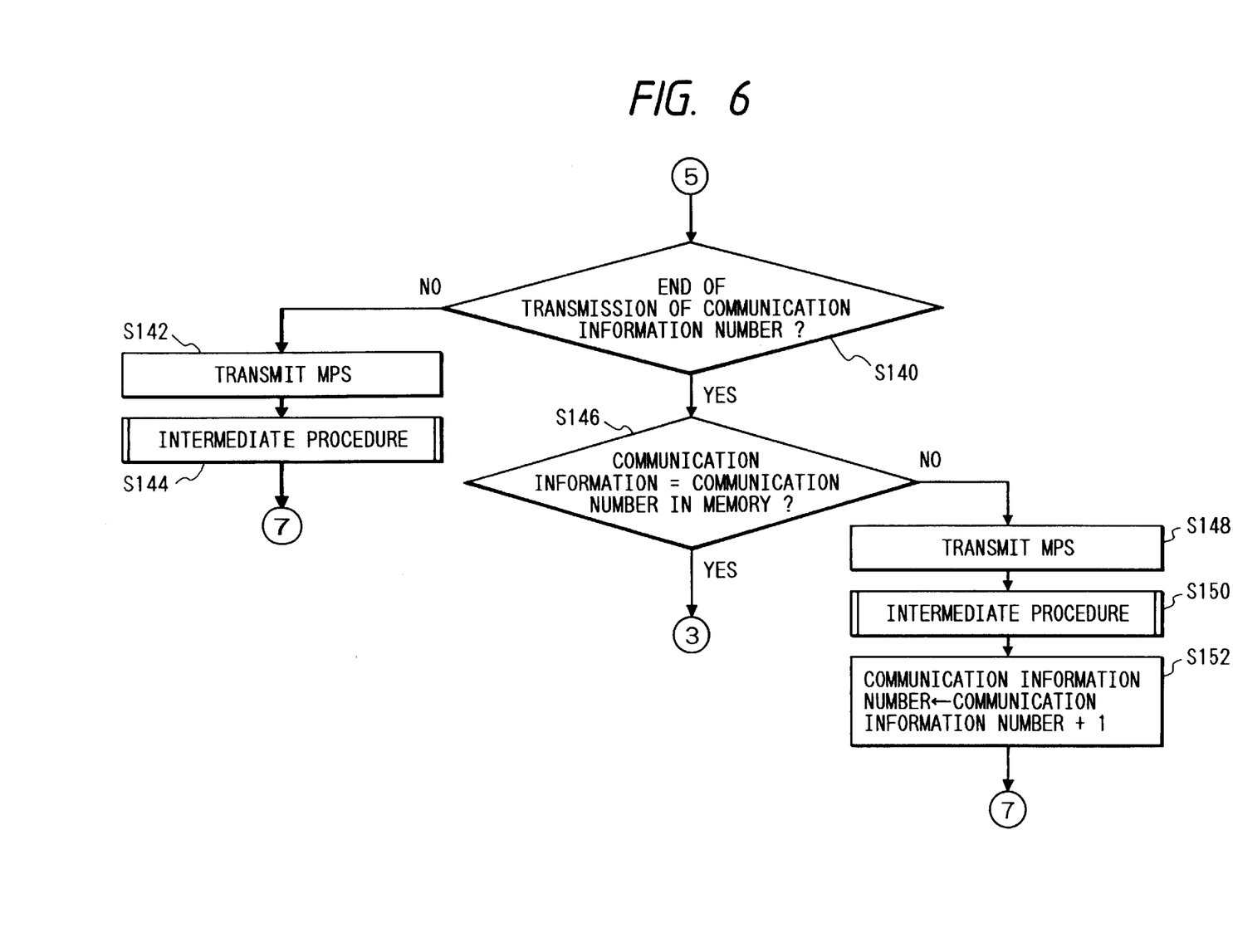
FIG. 6 is a flowchart showing the operation of the first embodiment.

In step S132, "1" is set into the communication information number in a manner similar to step S92. In step S134, "1" is set into the page number in a manner similar to step S94. In step S136, in a manner similar to step S96, the image information is inputted from the memory circuit 16, the page number is added to the information on the transmission side, and the resultant information of one page is transmitted. In step S138, the value of the page number is increased by "1" in a manner similar to step S98.

In step S140, a check is made to see if the transmission of the information of the communication information number has been finished or not in a manner similar to step S100. If NO, step S142 follows and an MPS signal is transmitted. After that, an intermediate-procedure (step S144) is executed.

When the transmission is finished in step S140, step S146 follows and a check is made to see if the communication information is equal to the communication number stored in the memory or not. When they are equal, step S114 follows. When they are not equal, the MPS signal is transmitted (S148). An intermediate-procedure (S150) is executed. After that, the value of the communication information number is increased by "1".

The embodiment has been described above with respect to the control on the transmitter side. A control on the receiver side will now be explained as a second embodiment.

Namely, the receiver of the second embodiments has the pause classifying means for classifying the information by the pause of each communication that is notified from the transmitter at the time of the mail post communication. Information indicating that the receiver has such means is notified to the transmitter. When the mode to be classified is designated from the transmitter by the pause of each communication, the receiver classifies by the pause of each communication. When such a mode is not designated, the bin to which the recording papers should be delivered in the sorter is changed every communication.

Figure 7:
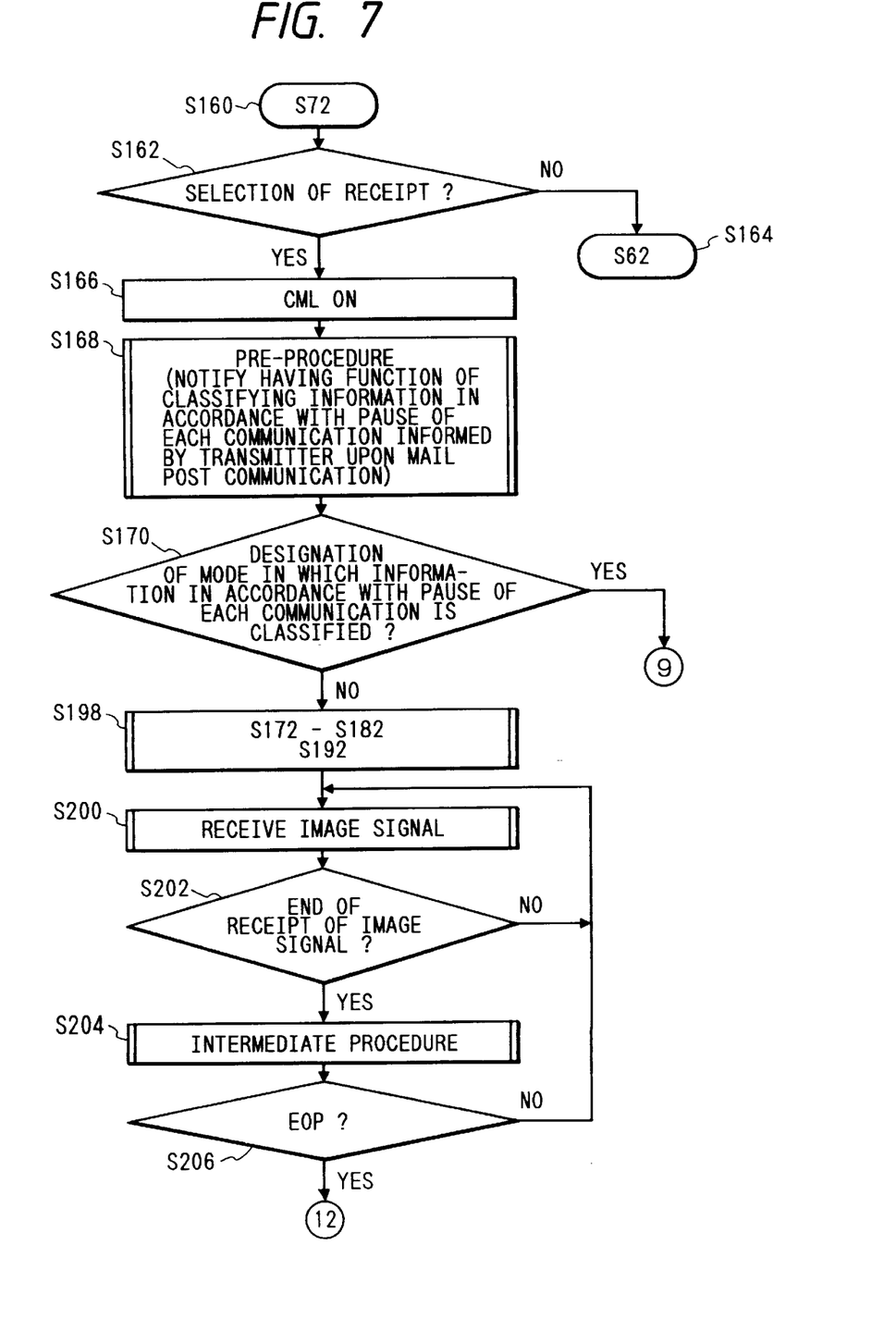
FIG. 7 is a flowchart showing the operation of the second embodiment of the invention.
Figure 8:
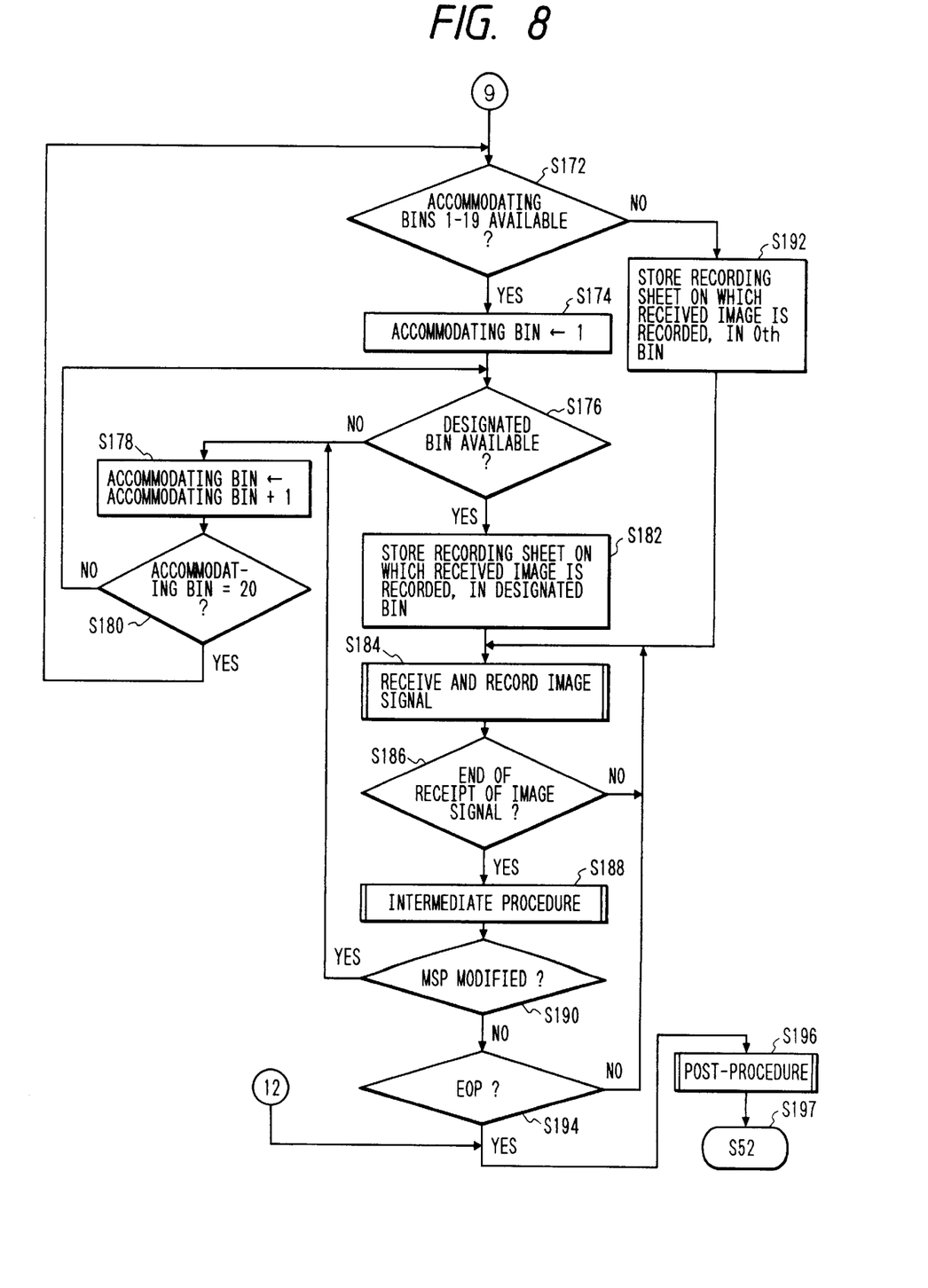
FIG. 8 is a flowchart showing the operation of the second embodiment.

FIGS. 7 and 8 are flowcharts showing portions in the operation of the second embodiment which are different from the flowchart of the first embodiment.

First, step S160 shows the step S72 mentioned above. In step S162, a check is made to see if the receipt has been selected or not. When the receipt is selected, step S166 follows. When the receipt is not selected, step S164 (S62 mentioned above) follows.

In step S166, by outputting the signal at the signal level "1" to the signal line 46a, the CML is turned on. In step S168, a pre-procedure is executed. At the time of the mail communication, the fact that the apparatus has the function to classify the information by the pause of each communication that is notified from the transmitter is informed.

In step S170, a check is made to see if the mode to classify the information by the pause of each communication has been designated in the mail post communication or not. If YES, step S172 follows. If NO, step S198 follows.

In step S172, a check is made to see if there is an available bin among the first to 19th bins of the output sorter or not. If YES, step S174 follows. If NO, step S192 follows.

In step S174, "1" is set into the accommodating bin. In step S176, a check is made to see if the designated accommodating bin is available or not. If YES, step S182 follows. If NO, step S178 follows and the accommodating bin number is increased by "1".

In step S180, a check is made to see if the accommodating bin number is equal to 20 or not. If YES, step S172 follows. If NO, step S176 follows.

In step S182, the value of the accommodating bin is outputted to the signal line 46g, thereby setting such that the recording paper on which the received image was recorded is outputted to the designated accommodating bin. In step S184, the image signal is received and recorded.

In step S186, a check is made to see if the reception of the image signal has been finished or not. If YES, step S188 follows. If NO, step S194 follows.

In step S188, an intermediate procedure is executed. In step S190, a check is made to see if the signal is the MPS modified signal indicative of the pause of each communication or not. If YES, step S178 follows. If NO, step S194 follows.

In step S192, the signal "0" is outputted to the signal line 46g, thereby setting the receiver so that the output paper of the received image is delivered to the 0th bin of the sorter.

In step S194, a check is made to see if the signal is the EOP signal or not. If YES, the post-procedure (S146 mentioned above) is executed. Step S197 (S52 mentioned above) follows. If NO, step S184 follows.

Step S198 denotes the processing steps S172 to S182 and S192. In step S200, the image signal is received and recorded. In step S202, a check is made to see if the receipt of the image signal has been finished or not. If YES, an intermediate-procedure is executed in step S204. In step S206, a check is made to see if the signal is the EOP signal or not. If YES, step S196 follows. If NO, step S200 follows.

Another operation example of the receiver will now be described as a third embodiment of the invention.

The receiver in the third embodiment has means for classifying every communication by the sorter at the time of reception. The fact that the receiver has such means is notified to the transmitter. When the mode to classify every communication by the sorter is designated from the transmitter, the receiver classifies every communication by the sorter. When such a mode is not designated, the recording paper is accommodated in the 0th bin of the sorter.

Figure 9:
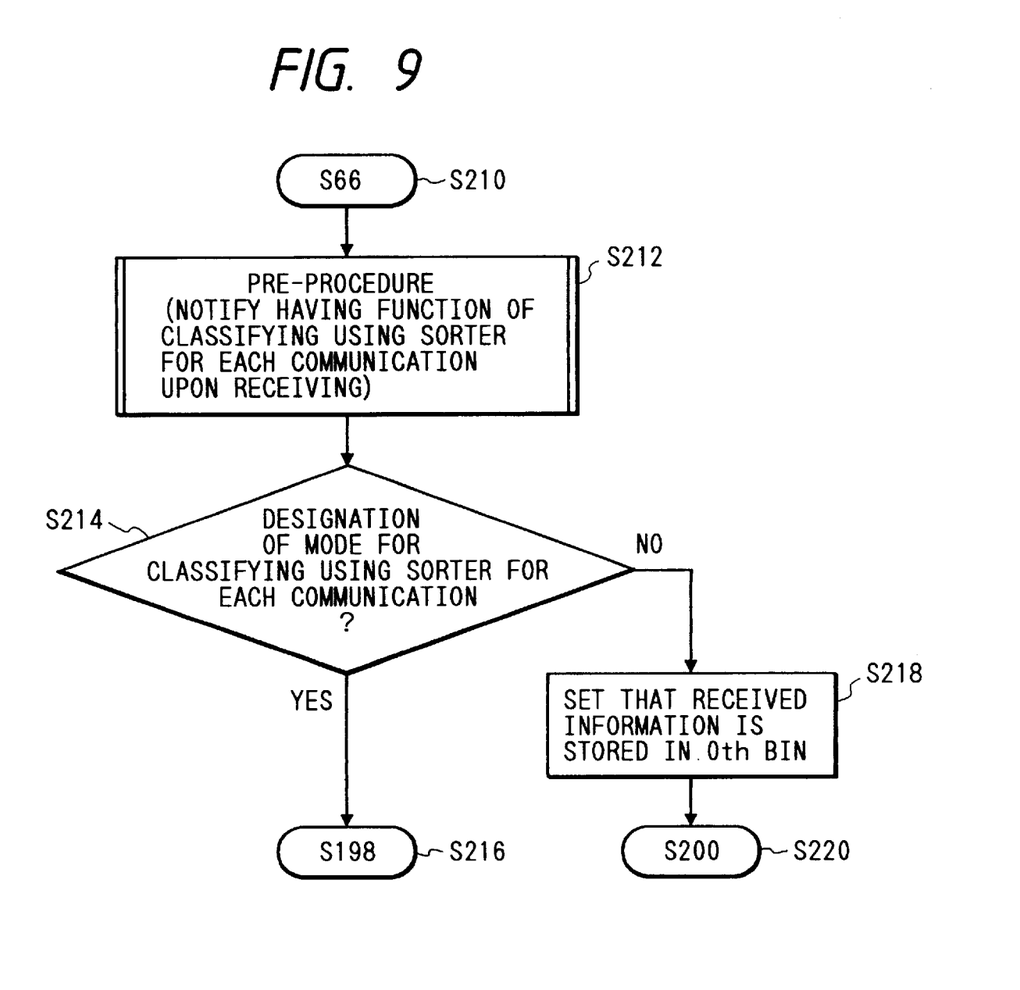
FIG. 9 is a flowchart showing the operation of the third embodiment of the invention.

FIG. 9 is a flowchart showing portions in the operation of the third embodiment which are different from the foregoing second embodiment.

Step S210 shows the processing step S166 mentioned above. In step S212, a pre-procedure is executed. The fact that the receiver has the function to classify every communication by the sorter at the time of reception is notified to the transmitter side.

In step S214, a check is made to see if the mode to classify by the sorter every communication has been designated from the partner's transmitter or not. If YES, step S216 (S198 mentioned above) follows. If NO, step S218 follows.

In step S218, the signal "0" is outputted to the signal line 46g, thereby setting so that the recording paper of the received image is accommodated to the 0th bin of the sorter. In step S220, the processing routine advances to step S200 mentioned above.

It is also possible to construct a receiver side in a manner such that the apparatus has the functions of both the second and third embodiments and when the mode to notify the pause of each communication is designated, the control of the second embodiment is executed and, when the mode to classify by the sorter every communication is designated, the control of the third embodiment is performed.

In the third embodiment, it is also possible to classify every communication by the sorter even if the mode to classify by the sorter every communication is not designated from the partner's transmitter.

In the embodiment, further, as a signal indicative of the pause of the communication, only the MPS modified signal without a mode change has been used. However, the EOM modified signal with a mode change can be also used.

As described above, in the case where the mail post communication is selected by the transmitter, if the receiver has the function to classify every communication by the sorter, the information indicative of the presence of a plurality of communications and the information of a plurality of transmission sides and reception sides are added and transmitted as information of the first page. Therefore, the operator on the receiver side can distribute the information of the mail post communication to the designated partner side.

What is claimed is:

1. A facsimile apparatus that includes a mail post transmitter adapted to perform a mail post transmission such that transmission information is stored into a memory and, when a predetermined time comes, one or a plurality of groups of transmission information stored until the predetermined time is transmitted in a lump to a receiver, wherein, when mail post transmission to the receiver is designated, page information including information indicating that there are the plurality of groups of transmission information and information of said apparatus and the receiver are transmitted as a first page, wherein said apparatus receives from the receiver information indicating whether the receiver includes a pause classifying unit for classifying information by a pause of each group that is notified from said apparatus at a time of the mail post transmission and a sorter classifying unit for classifying every group by a sorter at the time of the reception, and wherein, in a case where the mail post transmission is selected, said apparatus is constructed in a manner such that in a case where the receiver includes the pause classifying unit, said apparatus designates a mode to classify the information by a pause of each group into the receiver and notifies only the pause of each group, in a case where the receiver does not include the pause classifying unit but includes the sorter classifying unit, said apparatus designates a mode to classify every group by a sorter into the receiver, adds page information including a fact that there are a plurality of groups and information of said apparatus and the receiver to a first page, transmits a resultant information to the receiver, and does not notify a pause of each group, and, when the receiver does not include either of the two classifying units, said apparatus does not add the page information to the first page and does not notify of the pause of each group.

2. An apparatus according to claim 1, wherein, in the case where the receiver includes the pause classifying unit and notifies said apparatus that the receiver includes such a unit, and, when the mode to classify by the pause of each group is designated from said apparatus, the receiver classifies by the pause of each group.

3. An apparatus according to claim 1, wherein, in the case where the receiver includes the sorter classifying unit and notifies said apparatus that the receiver includes such a unit, and when the mode to classify every group by the sorter is designated from said apparatus, the receiver classifies every group by the sorter.

4. A data communication apparatus comprising:

a transmission unit adapted to selectively transmit either one group of data or a plurality of groups of data, each group having at least one page of data;

a discriminator adapted to discriminate whether the one group of data is to be transmitted or whether the plurality of groups of data are to be transmitted in a lump;

a generator adapted to generate information indicating that the plurality of groups of data are transmitted in a lump in response to said discriminator discriminating that the plurality of groups of data are to be transmitted in a lump, wherein said transmission unit transmits the information and the plurality of groups of data when said discriminator discriminates that the plurality of groups of data are to be transmitted in a lump.

5. An apparatus according to claim 4, wherein said transmission unit transmits the information prior to the plurality of groups of data when said discriminator discriminates that the plurality of groups of data are to be transmitted in a lump.

6. An apparatus according to claim 4, wherein said generator further generates transmitter information identifying said apparatus, and wherein said transmission unit further transmits the transmitter information.

7. An apparatus according to claim 4, wherein said generator further generates receiver information indicating a receiver apparatus to which said transmission unit transmits data, and wherein said transmission unit further transmits the receiver information.

8. An apparatus according to claim 4, further comprising a time setter adapted to set a predetermined time, wherein said transmission unit transmits the plurality of groups of data when the time set by said time setter is reached, when said discriminator discriminates that the plurality of groups of data are to be transmitted in a lump.

9. A data communication method comprising the steps of:

selectively transmitting either one group of data or a plurality of groups of data, each group having at least one page of data;

discriminating whether the one group of data is to be transmitted or whether the plurality of groups of data are to be transmitted in a lump;

generating information indicating that the plurality of groups of data are transmitted in a lump in response to said discriminating step discriminating that the plurality of groups of data are to be transmitted in a lump, wherein said transmission step transmits the information and the plurality of groups of data when said discriminating step discriminates that the plurality of groups of data are to be transmitted in a lump.

10. A method according to claim 9, wherein said transmission step transmits the information prior to the plurality of groups of data when said discriminating step discriminates that the plurality of groups of data are to be transmitted in a lump.

11. A method according to claim 9, wherein said generating step further generates transmitter information identifying an apparatus in which said method is operative, and wherein said transmission step further transmits the transmitter information.

12. A method according to claim 9, wherein said generating step further generates receiver information indicating a receiver apparatus to which said transmission step transmits data, and wherein said transmission step further transmits the receiver information.

13. A method according to claim 9, further comprising a setting step for setting a predetermined time, wherein said transmission step transmits the plurality of groups of data when the time set by said setting step is reached, when said discriminating step discriminates that the plurality of groups of data are to be transmitted in a lump.

* * * * *

UNITED STATES PATENT AND TRADEMARK OFFICE
CERTIFICATE OF CORRECTION

PATENT NO. : 6,256,113 B1
DATED : July 3, 2001
INVENTOR(S) : Takehiro Yoshida

It is certified that error appears in the above-identified patent and that said Letters Patent is hereby corrected as shown below:

<u>Title page,</u>
Item [57] ABSTRACT,
Line 3, "An object of the invention is to provide a" should be deleted.

<u>Column 55,</u>
Lines 30 and 34, "transmitter" should read -- the transmitter --.

Signed and Sealed this

Nineteenth Day of March, 2002

Attest:

JAMES E. ROGAN
*Director of the United States Patent and Trademark Office*

*Attesting Officer*